(12) United States Patent
Roy Paladhi et al.

(10) Patent No.: US 11,157,274 B2
(45) Date of Patent: Oct. 26, 2021

(54) ARCHITECTURE WITH MICRO-CONTROLLER AND HIGH-SPEED ACTIVE CABLES

(71) Applicant: International Business Machines Corporation, Armonk, NY (US)

(72) Inventors: Pavel Roy Paladhi, Pflugerville, TX (US); Prasanna Jayaraman, Pflugerville, TX (US); Nam Huu Pham, Round Rock, TX (US); Daniel M. Dreps, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/695,288

(22) Filed: Nov. 26, 2019

(65) Prior Publication Data

US 2021/0157579 A1    May 27, 2021

(51) Int. Cl.
*G06F 9/22*    (2006.01)
*G05B 19/042*    (2006.01)

(52) U.S. Cl.
CPC .......... *G06F 9/223* (2013.01); *G05B 19/0423* (2013.01); *G05B 2219/25257* (2013.01)

(58) Field of Classification Search
None
See application file for complete search history.

(56) References Cited

U.S. PATENT DOCUMENTS

| | | |
|---|---|---|
| 6,236,582 B1 | 5/2001 | Jalaleddine |
| 7,902,966 B1 | 3/2011 | Beitelmal et al. |
| 8,391,301 B2 | 3/2013 | Canning et al. |
| 8,811,459 B1 | 8/2014 | Tanner |
| 9,748,696 B2 | 8/2017 | Nishimura et al. |
| 10,067,545 B2 | 9/2018 | Dunstan |
| 10,241,953 B2 | 3/2019 | Mishra et al. |
| 10,313,432 B2 | 6/2019 | Chen et al. |
| 10,338,653 B2 | 7/2019 | Giles |
| 2009/0307392 A1* | 12/2009 | Mychalowych .... G06F 13/4045 710/51 |
| 2009/0313485 A1 | 12/2009 | Huang |

(Continued)

FOREIGN PATENT DOCUMENTS

EP    1819028 A2    8/2007

OTHER PUBLICATIONS

IBM Appendix P., "List of IBM Patents or Patent Applications to be Treated as Related", Dated Nov. 26, 2019, 2 pages.

(Continued)

*Primary Examiner* — Scott C Sun
(74) *Attorney, Agent, or Firm* — Erika R. DeCosty

(57) ABSTRACT

A computer uses an active cable architecture to control communications. The computer sends a first set of instructions for completion of an activity to a first micro-controller of an active communication cable. The computer determines that at least one transceiver of an active cable is to receive a set of signals from the first micro-controller. The computer forms a communication connection between the first micro-controller and the at least one transceiver. The computer sends a second set of instructions to the at least one transceiver, wherein the second set of instructions instruct the at least one transceiver to complete at least a portion of the activity.

20 Claims, 8 Drawing Sheets

(56) References Cited

U.S. PATENT DOCUMENTS

| | | |
|---|---|---|
| 2012/0284539 A1 | 11/2012 | Cheng |
| 2014/0223041 A1 | 8/2014 | Chang et al. |
| 2016/0134484 A1* | 5/2016 | Tanaka .................. H04L 41/12 345/633 |
| 2016/0356836 A1 | 12/2016 | Horan |
| 2017/0269656 A1 | 9/2017 | Seki |
| 2018/0024608 A1 | 1/2018 | Kaplan |
| 2018/0341563 A1 | 11/2018 | Chiang et al. |
| 2019/0036677 A1 | 1/2019 | Akondy |
| 2019/0188164 A1 | 1/2019 | Avrukin et al. |
| 2019/0163496 A1 | 5/2019 | Walker |
| 2019/0208163 A1 | 7/2019 | Campbell et al. |
| 2019/0214164 A1 | 7/2019 | Chung et al. |

OTHER PUBLICATIONS

Roy Paladhi et al., "Redundant Voltage Delivery With Active Cables", U.S. Appl. No. 16/695,398, filed Nov. 26, 2019, 40 pages.
Hamid et al., "Microcontroller Based Master Slave Communication for Electrical Stepper Motor", International Journal of Science and Research (IJSR), vol. 5 Issue 5, May 2016, 4 pages.
Hou et al., "FPGA-based EtherCAT Microcontroller circuit design of SPI communication for real-time systems", Journal of Microelectronics, Electronic Components and Materials, vol. 44, No. 2 (2014), © MIDEM Society, 168-173.
Popa et al., "Serial Bus Monitoring Software for Microcontrollers Embedded in Mechatronic Systems", Research Gate, Jul. 2008, 14 pages.
Zhou et al., "Communication Buses and Protocols for Sensor Networks", Sensors 2002, 2,© 2002 by MDPI, pp. 244-257.

\* cited by examiner

ARCHITECTURE WITH MICRO-CONTROLLER AND HIGH-SPEED ACTIVE CABLES

BACKGROUND

The present disclosure relates generally to the field of communication systems, and more particularly to components for an active cable system.

Signal integrity primarily involves the electrical performance of the wires and other packaging structures used to move signals within an electronic product or from one product to another. Such performance is a matter of physics and as such has remained relatively unchanged since the inception of electronic signaling.

The first transatlantic telegraph cable suffered from severe signal integrity problems, and analysis of the problems yielded many of the mathematical tools still used today to analyze signal integrity problems, such as the telegrapher's equations. Products as old as the Western Electric crossbar telephone exchange (circa 1940), based on the wire-spring relay, suffered almost all the effects seen today—the ringing, crosstalk, ground bounce, and power supply noise that plague modern digital products. With many communication systems, consistent performance is a factor that is considered when a provider is selected by a client.

SUMMARY

Embodiments of the present disclosure provide a computer implemented method for an active cable system in which: A computer sends a first set of instructions for completion of an activity to a first micro-controller of an active communication cable. The computer determines that at least one transceiver of an active cable is to receive a set of signals from the first micro-controller. The computer forms a communication connection between the first micro-controller and the at least one transceiver. The computer sends a second set of instructions to the at least one transceiver. The second set of instructions instruct the at least one transceiver to complete at least a portion of the activity.

Embodiments of the present disclosure provide a computer program product for an active cable system. The computer program product is embodied as program instructions stored on a computer readable storage medium. The program instructions comprise instructions to cause a computing device to perform a method in which: A computer sends a first set of instructions for completion of an activity to a first micro-controller of an active communication cable. The computer determines that at least one transceiver of an active cable is to receive a set of signals from the first micro-controller. The computer forms a communication connection between the first micro-controller and the at least one transceiver. The computer sends a second set of instructions to the at least one transceiver. The second set of instructions instruct the at least one transceiver to complete at least a portion of the activity.

Embodiments of the present disclosure provide a computer system for an active cable system. The computer system including program instructions stored on a computer readable storage medium that, when executed by the computer system, causes the computer system to perform a method in which: A computer sends a first set of instructions for completion of an activity to a first micro-controller of an active communication cable. The computer determines that at least one transceiver of an active cable is to receive a set of signals from the first micro-controller. The computer forms a communication connection between the first micro-controller and the at least one transceiver. The computer sends a second set of instructions to the at least one transceiver. The second set of instructions instruct the at least one transceiver to complete at least a portion of the activity.

Still yet, any of the components of the present invention could be deployed, managed, serviced, etc., by a service provider who offers to implement an architecture that with micro-controllers and active cables in a computer system. Embodiments of the present invention also provide and encompass related systems, methods, and/or program products.

BRIEF DESCRIPTION OF THE DRAWINGS

These and other features of this invention will be more readily understood from the following detailed description of the various aspects of the invention taken in conjunction with the accompanying drawings.

DETAILED DESCRIPTION

Figure 1:
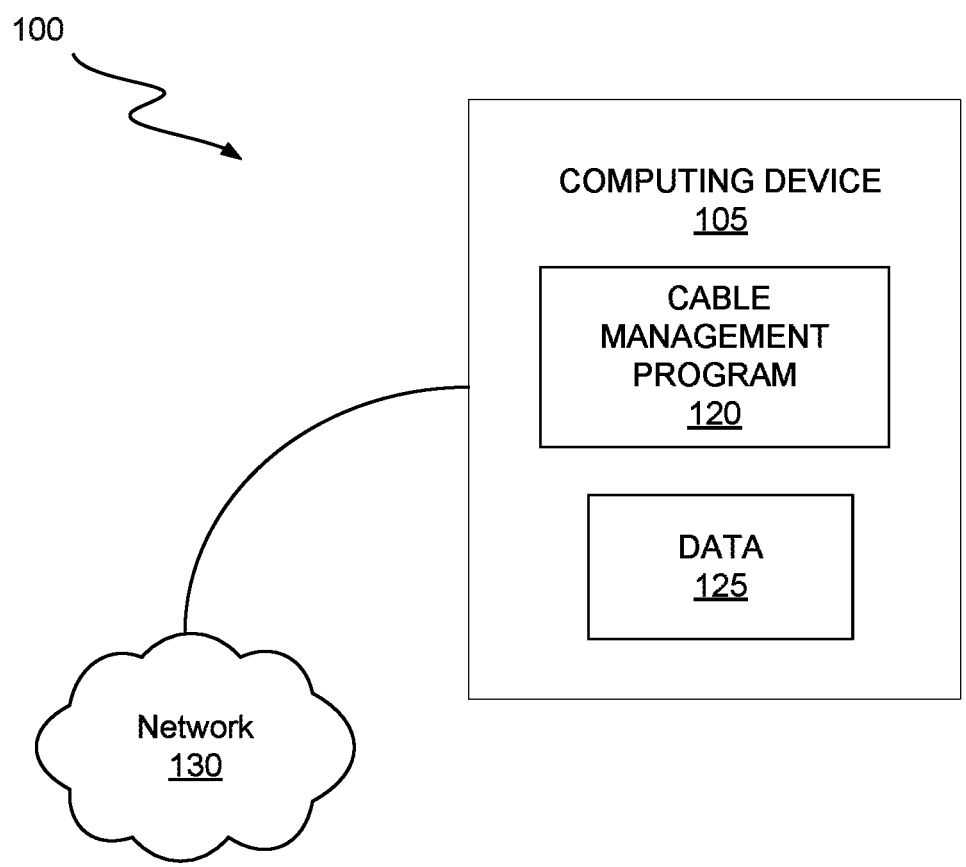
FIG. 1 is a functional block diagram illustrating a computing environment, in accordance with an exemplary embodiment of the present invention.

Detailed embodiments of the present invention are disclosed herein with reference to the accompanying drawings. In the drawings, like numbering represents like elements. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Signal integrity or SI is a set of measures of the quality of an electrical signal. In digital electronics, a stream of binary values is represented by a voltage (or current) waveform. However, digital signals are fundamentally analog in nature, and all signals are subject to effects such as noise, distortion, and loss. Over short distances and at low bit rates, a simple conductor can transmit this with sufficient fidelity. At high bit rates and over longer distances or through various mediums, various effects can degrade the electrical signal to the point where errors occur, and the system or device fails. Signal integrity engineering is the task of analyzing and mitigating these effects. It is an important activity at all levels of electronics packaging and assembly, from internal connections of an integrated circuit (IC), through the package, the printed circuit board (PCB), the backplane, and inter-system connections. While there are some common themes at these various levels, there are also practical considerations, in particular the interconnect flight time versus the bit period, that cause substantial differences in the approach to signal integrity for on-chip connections versus chip-to-chip connections. Some of the main issues of concern for signal integrity are ringing, crosstalk, ground bounce, distortion, signal loss, and power supply noise.

One embodiment provides a system for mitigating voltage regulator failure in a cable end, comprising: a plurality of cables configured to share regulator voltage; a circuit to switch a voltage source from a first cable in the plurality of cables to a voltage source from a second cable in the plurality of cables, upon failure of the voltage source of the first cable.

One embodiment provides an active cable architecture, comprising: a first transceiver on a first side of the cable; a second transceiver on a second side of the cable; and a first micro-controller that controls the first transceiver and the second transceiver, wherein the first micro-controller is configured to (i) decipher and complete an activity based on single commands accessed through a software interface and (ii) to internally connect a required signal to either end of the cable. For further details see FIG. 6A and the associated description. The active cable architecture further comprising a second micro-controller that processes software related updates and checking. The second micro-controller can receive and follow instructions that are sent from the first micro-controller, wherein the first micro-controller controls cable inputs. For further details see FIG. 6B and the associated description.

A transceiver is a device comprising both a transmitter and a receiver that are combined and share common circuitry or a single housing. Transceivers for server computers are often called Medium Attachment Units (MAUs) in IEEE 802.3 documents and were widely used in 10BASE2 and 10BASE5 Ethernet networks. Fiber-optic gigabit, 10 Gigabit Ethernet, 40 Gigabit Ethernet, and 100 Gigabit Ethernet utilize, for example, transceivers known as GBIC, SFP, SFP+, QSFP, XFP, XAUI, CXP, and CFP.

An inter-integrated circuit (I2C) bus uses two lines, serial data (SDA) and serial clock (SCL), to transfer information between devices connected to the bus. I2C devices have open-drain outputs. When an I2C device drives a low, the output of the devices pulls the bus to ground. When an I2C device switches high, the output of the device goes into a high-Z state where the bus is pulled up to VDD by a pull-up resistor connected between the bus and VDD. The pull-up resistors along with the capacitance of the cabling or bus creates a charging RC time constant. If using off board cabling or very long buses, the total bus capacitance increases, which increases the rise time of the signal and reduces maximum operating frequency. The total bus capacitance also increases with the number of devices connected to the bus. The I2C bus specifications restrict the rise time of a signal for different operating frequencies. The fast-mode plus (1 MHz maximum operating frequency) specification declares a maximum rise time for a data or clock signal to be 120 ns. If 1 MHz operating frequency is not necessary, fast mode (400 kHz maximum operating frequency) can be used, which permits a rise time up to 300 ns.

For high data rate signaling through communication buses in enterprise class performance server computers, maintaining signal quality is essential to set up a robust link. The aspects that dictate signal integrity and provide for the accurate data transfer include, but are not limited to, (i) low channel losses, (ii) low impedance mismatches, and (iii) low crosstalk. With some data rates, drawer to drawer communication is achieved through highly specialized cables capable of maintaining data throughputs at these data rates or bandwidths. High speed cables could be metal-wire based (like coax cables, twin-axial cables), optical cables etc. These cables can use lower loss dielectrics and having well contained propagation modes within an enclosed environment, have much lower loss figures than, for example, microstrips or striplines. For long lengths of electric cables, boosting mechanisms (amplification, equalization etc.) and error correction schemes are implemented at two ends of a long cable to ensure error-free signal transmission.

Active cables are cables for data transmission that use an electronic circuit to boost the performance of the cable. Without an electronic circuit a cable is considered a 'passive' cable. Passive cables are liable to degrade the data they carry, due to "channel impairments" including attenuation, crosstalk and group velocity distortion. In active cables, a circuit using one or several integrated circuits is embedded in the cable to compensate for some or all of these impairments. This active boosting can allow some cables to be more compact, thinner, longer and transmit data faster than their passive equivalents. In some scenarios, cables can be made longer, i.e., have increased range, due to the use of active elements that boost the signal at certain points along the cable length, but they may not necessarily be more compact. Active cables are used in enterprise networks which form the backbone of modern data communication systems, such as connections between server drawers, and also to interconnect consumer level devices such as, for example, cameras, gaming consoles and high definition televisions. Embedding circuitry in cables can allow less metal, for example copper, to be used in cable production while still maintaining the same level of performance, and while reducing the weight of the cable by as much as eighty percent and reducing the diameter of the cable. Other benefits may include longer reach and lower power consumption. For example, some active cables have demonstrated up to fivefold longer reach, i.e., maximum length, when compared to simple passive cables, while consuming approximately seventy five percent less power when compared to equivalent fiber-based interconnects.

The active component in active cables is a semiconductor device, typically located at one or both ends of the cable, which acts to boost the quality of the data signal. A typical component in such systems is a voltage regulator that is designed to automatically maintain a constant voltage level for the signals being transmitted through the cable. A voltage regulator may use a simple feed-forward design or may include negative feedback. It may use an electromechanical mechanism, or electronic components. Depending on the design, it may be used to regulate one or more AC or DC voltages.

A common technology used in active cables is equalization and de-skew, both forms of filtering and amplification which is applied to the signal before it leaves the connector at the end of the cable. In some cases, chips are used at both ends of an active cable where the first device actively boosts the signal before it is transmitted over the copper lines and the second chip improves the signal integrity before it leaves the end connector.

Active cables often play a role in enterprise and storage applications due to the confined space and air-flow requirements in data centers and long reaches (up to 30 meters) required to make some of the rack-to-rack connections. Because active cables can facilitate thin cable gauges, a tighter bend radius results, which can give cables in these applications better routability (i.e., an increased ease of routing and/or an increase in options for routing the cable) and improved airflow.

Some solutions leverage a technique in which: (1) Using drivers at two ends of an active cable connecting two drawers in a server cluster: The cable receives a signal from one drawer and redrives the signal at an increased power level, when compared to the power level the signal had when the signal was received by the driver, towards its far end. At the far end the signal is re-driven to full amplitude into the motherboard of the far end drawer. (2) The equalization and gain factors used in this transmission are selected based on the channel loss and dispersion properties. (3) The two re-drivers at both ends of the cable have dedicated micro-controllers for signal timing, setting the gain and equalization parameters etc. The micro-controllers are generally accessible from the host/CPU for control. (4) Several other parameters of the re-driver chip and other components within the cable end are controlled by the micro controller, which in turn is controlled by host/CPU. As such, the clock recovery and signal timing process constitute a distinct step in maintaining error-free data transfer. Embodiments provide control schemes that, when compared to these other solutions, provide more efficient and robust systems that can better maintain error free high data rates through cables.

FIG. 1 is a functional block diagram illustrating computing environment, generally designated 100, in accordance with one embodiment of the present invention. Computing environment 100 includes computing device 105 connected over network 130. Computing device 105 includes cable management program 120 and data 125.

In various embodiments of the present invention, computing device 105 is a computing device that can be a standalone device, a server, a laptop computer, a tablet computer, a netbook computer, a personal computer (PC), or a desktop computer. In another embodiment, computing device 105 represents a computing system utilizing clustered computers and components to act as a single pool of seamless resources. In general, computing device 105 can be any computing device or a combination of devices with access to cable management program 120 and data 125 and is capable of executing cable management program 120. Computing device 105 may include internal and external hardware components, as depicted and described in further detail with respect to FIG. 7.

In this exemplary embodiment, cable management program 120 and data 125 are stored on computing device 105. However, in other embodiments, cable management program 120 and data 125 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 105 and cable management program 120 and data 125, in accordance with a desired embodiment of the present invention.

Embodiments recognize that various functions of cable management program 120 may be executed by, hardcoded as part of, and/or otherwise carried out by/use various components included in computing device 105.

One embodiment of the present invention provides a system that improves high-speed active cable design architecture by use of a single micro-controller design, in which one micro controller controls the transceivers on both ends of the cable. The system includes additional functionality/capability via software interfaces that provide access/use of single commands that the micro-controller can decipher and use to complete a given activity. Such a given activity may include, for example, one or a combination of: checking the status of a micro-controller, reading the temperature of a microprocessor, configuring a function inside the re-timer/transceiver chip, and/or changing a lane specific setting in the register set of an integrated circuit. In general, embodiments internally connect the required signals to the other end of the cable.

One embodiment of the present invention provides a system that improves high-speed active cable design architecture by use of a dual micro-controller design, where the capability to handle all the software related updates and checks, by talking to one micro-controller, enables leader-follower structure, so the second micro-controller can respond to instructions received from the first micro-controller, but all the initial inputs are received by the first micro controller.

General active cable topology has two ends that contains the micro controller to help with configuring the transceiver and repeaters. In some server environments, these cables have an I2C path that is used in connecting and configuring the cable ends. Sometimes these cable ends plug into different server chassis/racks and the communication between these chassis/racks is sometimes not established as a result of incompatibilities between the two server chassis/racks. In such scenarios, a single micro controller design approach may help one end, i.e., one server chassis/rack, to manage the whole cable.

Embodiments recognize that certain advantages may result from the use of this single micro-controller design. For example, one micro-controller effectively handles both the ends of the cable. All the components are connected to the single micro-controller. This topology can be enabled by driving/using the I2C part of the cable thereby connecting to the other side of the cable. In some embodiments of the single micro-controller design, the micro-controller effectively handles the configuration for any task, debug activities and the initialization of certain settings. In some embodiments of the single micro-controller design, the required multiple interventions from the host to setup debug conditions is simplified.

For example, in one scenario, there is a function, i.e., program logic, that, when executed, controls the connection settings for a given a lane, which connects two different microprocessor chips that are respectively located at an of the end of the cable. This connection therefore has certain properties that, in some embodiments, are tracked in real time. In one embodiment, an initiation request is sent to the micro-controller that includes instructions to set up both ends of the cable, perform the function and stop at the same time for both ends, and give a complete answer. In an embodiment of the two micro-controller approach, host coding communicated to the two micro-controllers to set up the communication, read back responses at both ends of the cable, and then compare the results of what was read. An example of that function may include, but are not limited to, one or a combination of: (i) eye margin read, (ii) error rate analysis, and/or (iii) turning on/off a bit sequence generator/checker.

In some embodiments of the single micro-controller design, the use of the single micro-controller reduces the cost of the system and performance savings during operation of the system, e.g., less power consumed, since there is only one micro-controller to purchase and operate, as opposed to having two micro-controllers. In some embodiments of the single micro-controller design, the use of the additional unused lanes to get the I2C traffic across yields a scenario in which the second side need not be connected to host. The boundary of the host to reach the other end of the cable therefore depends on the capability of the final endpoint attachment to talk to the micro-controller. In some embodiments of the single micro-controller design, the use of the single micro-controller reduces the overall complexity insofar as only the single micro-controller for the cable is interacting with the software. An example of an embodiment of the single micro-controller design can be seen in FIGS. 2A-2B.

Figure 2A:
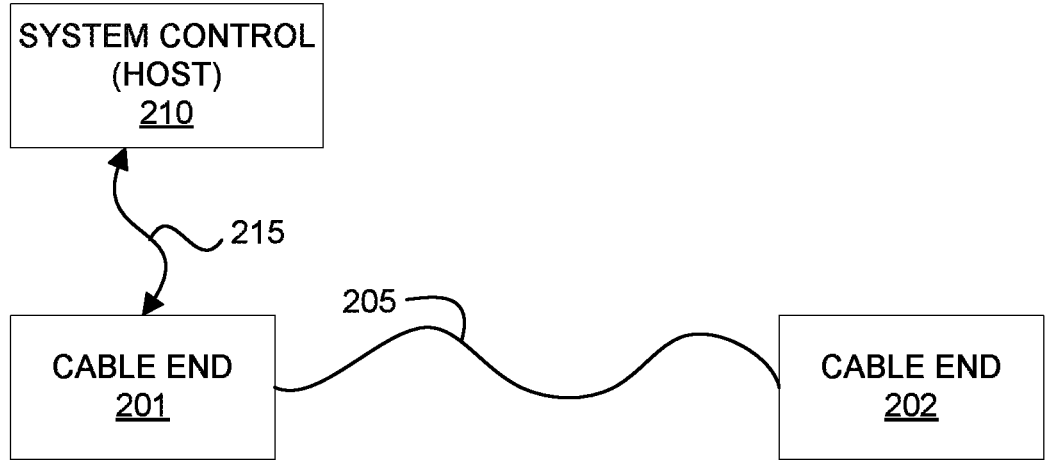
FIGS. 2A-2B illustrate an example of an embodiment with a single micro-controller configuration.
Figure 2B:
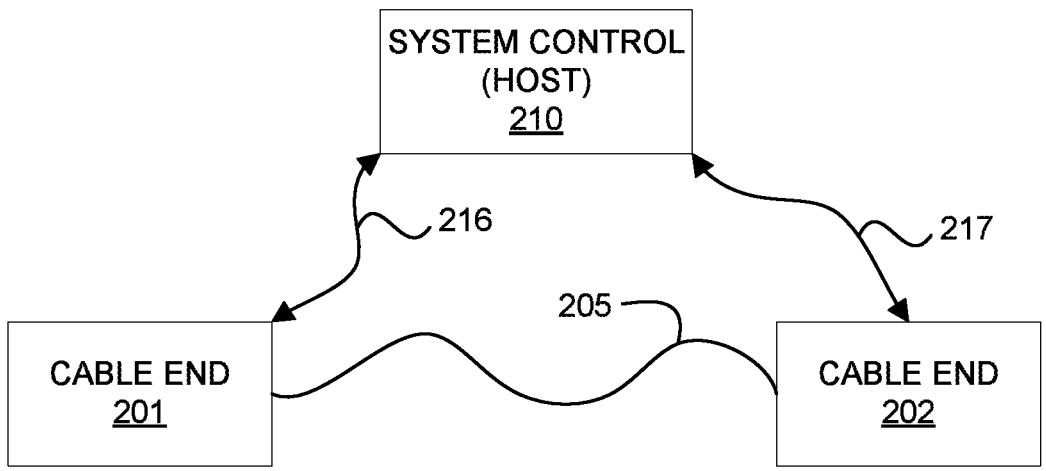

In FIG. 2A, system control 210, which is a host system, shares an I2C communication channel 215 with cable end 201. Cable end 201 is connected to cable end 202 via cable 205. Similarly, in FIG. 2B, system control 210 has two I2C communication channels, numbered 216 and 217, that respectively connect to cable end 201 and 202.

Embodiments recognize that certain advantages may result from the use of a two micro-controller approach. In some embodiments of the two micro-controller approach, a first micro-controller attached to a first end of a cable has the capability to maintain and work with a second micro-controller attached to the other end of the cable. In some embodiments of the two micro-controller approach, the updates are targeted to the first micro controller and the second one is automatically updated based on the handshake from the first micro-controller. For further details see FIG. 6C and the associated description.

In some embodiments of the two micro-controller approach, all the high-speed interface related queries are stacked up between the first and second micro controller and presented to the user in a single format. In some scenarios and embodiments, this stacking reduces the amount of host programming that is required to handle the logistics and programming of independently operating with the second micro controller. In some embodiments of the two micro-controller approach, the second micro controller does not need to be connected back to the host. As such, when there is connectivity between two micro-controllers, and insofar as they are in sync and respond to all the information via the first micro-controller, then there is a decreased number of scenarios that require a connection of the second micro-controller to the host itself since the two micro-controllers are communicating. In other words, (i) if the design dictates that the second micro-controller is required to be connected to the host and (ii) if there is no way to connect the second micro-controller to the host, then this approach may be leveraged such that both micro-controllers are in synch but only one of those micro-controllers can talk to the host. An example of an embodiment of the two micro-controller design can be seen in FIGS. 3A-3B.

Figure 3A:
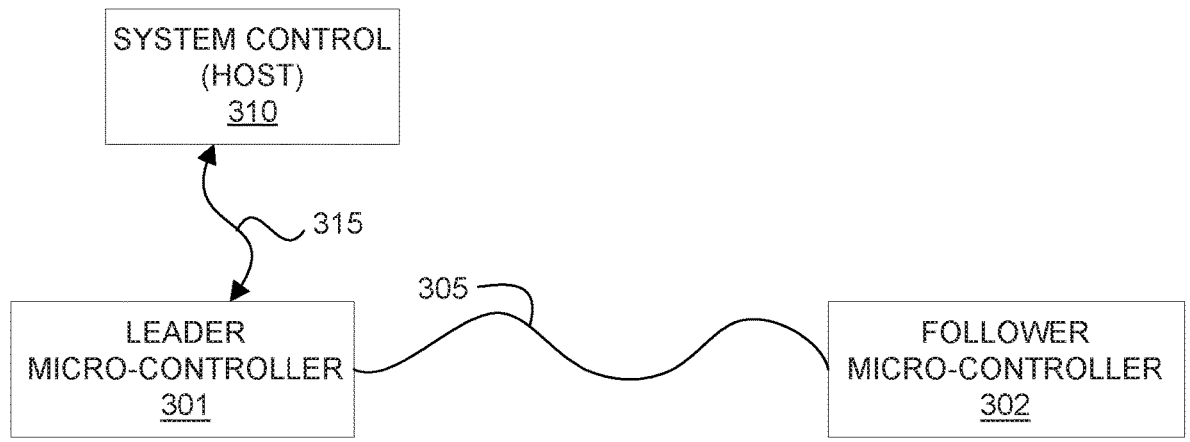
FIGS. 3A-3B illustrate an example of an embodiment with a two micro-controller configuration.
Figure 3B:
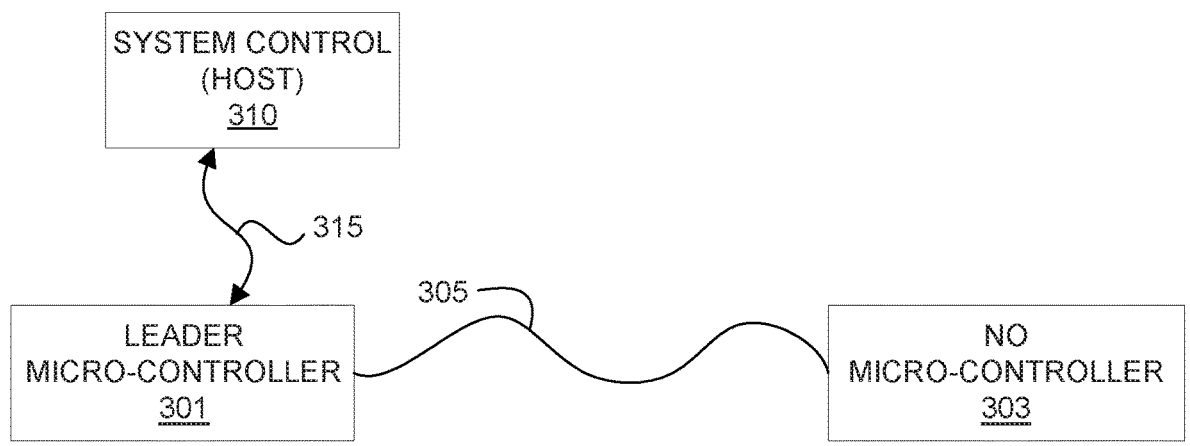

As shown in FIGS. 3A-3B, both of the depicted embodiments include a system control 310, which is a host system, that shares an I2C communication channel 315 with leader micro-controller 301, which is further connected to cable 305. However, FIG. 3A further includes a second micro-controller, denoted follower micro-controller 302. Follower micro-controller is under the control of leader micro-controller 301. In contrast, in FIG. 3B, there is no follower micro-controller 302. Instead the other end of cable 305, opposite from leader micro-controller 301, is attached to a junction, 303, that has no micro-controller.

Some embodiments of the present invention provide a redundant voltage delivery design for high-speed interfaces involving active cables. Embodiments recognize that active cables are common choice for high-speed signal communications and often follow communication standards that drive the active cable topology, for example CXP. However, custom cabling construction is practiced across the industry on high-speed buses that are often proprietary. In such scenarios, several components are typically combined to make those active cables and each of those components can have different rates of failure. Embodiments recognize that active cables typically include one or more of the following components, and/or multiples thereof: a microcontroller, a re-driver or transponder, a voltage regulator, and a temperature sensor. Embodiments recognize that, in some scenarios, the failure of a given component is mitigated by a system design which avoids single point of failure by having redundancy built in.

Figure 4A:
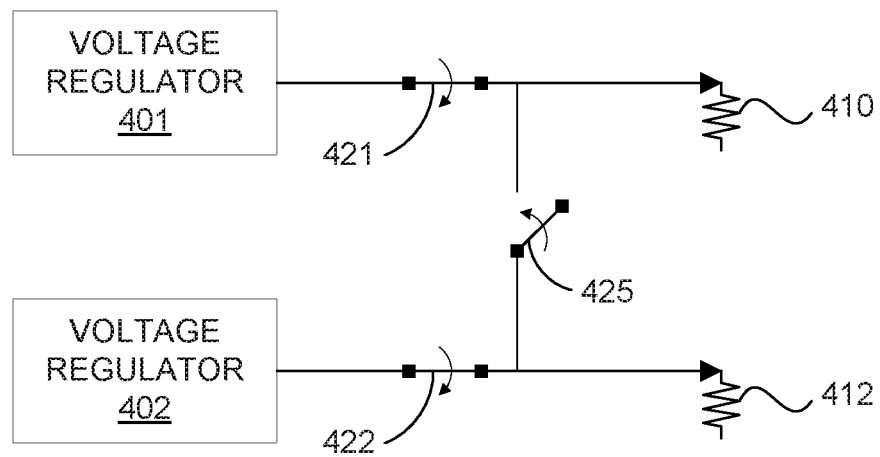
FIGS. 4A-4B illustrate an example of an embodiment that includes cable level power sharing.
Figure 4B:
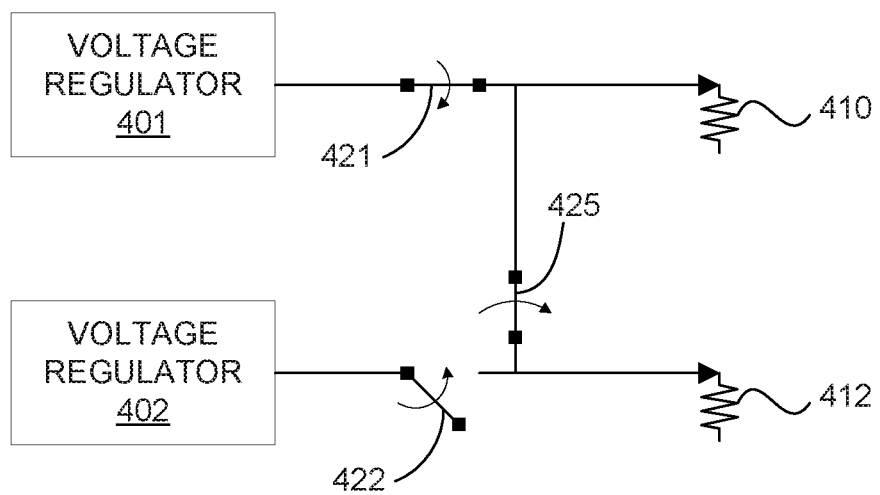

Some embodiments provide mitigation of voltage regulator failure in an active cable end by: (i) creating a design that shares the regulator voltage from other cables in case of failure; (ii) leveraging a circuit to switch from the failed voltage regulator to a voltage source of another cable in the design; and (iii) provide the capability to use the pins that supply internal voltage for different purposes in the design. An example of an embodiment that includes cable level power sharing is shown in FIGS. 4A-4B. An example of an embodiment that includes system level power sharing is shown in FIGS. 5A-5B.

In FIGS. 4A-4B, voltage regulators 401 and 402 are connected to a wiring system that includes switches 421, 422, and 425. Further, the depicted embodiments include load 410 and load 412. In FIG. 4A, switches 421 and 422 are closed with switch 425 being open. This configuration applies for an embodiment and scenario in which voltage regulators 401 and 402 are configured as backups for each other but neither voltage regulators 401 nor 402 have failed. As such, voltage regulator 401 supplies power for load 410 and voltage regulator 402 supplies power for load 412. In contrast, FIG. 4B illustrates an embodiment and scenario in which voltage regulator 402 has failed and voltage regulator 401 is now supplying power for both load 410 and load 412.

FIG. 4B also illustrates that switch 422 has been opened, thereby cutting voltage regulators 402 out from the circuit, and switch 425 has been closed such that power is routed from voltage regulators 401 to load 412.

Figure 5A:
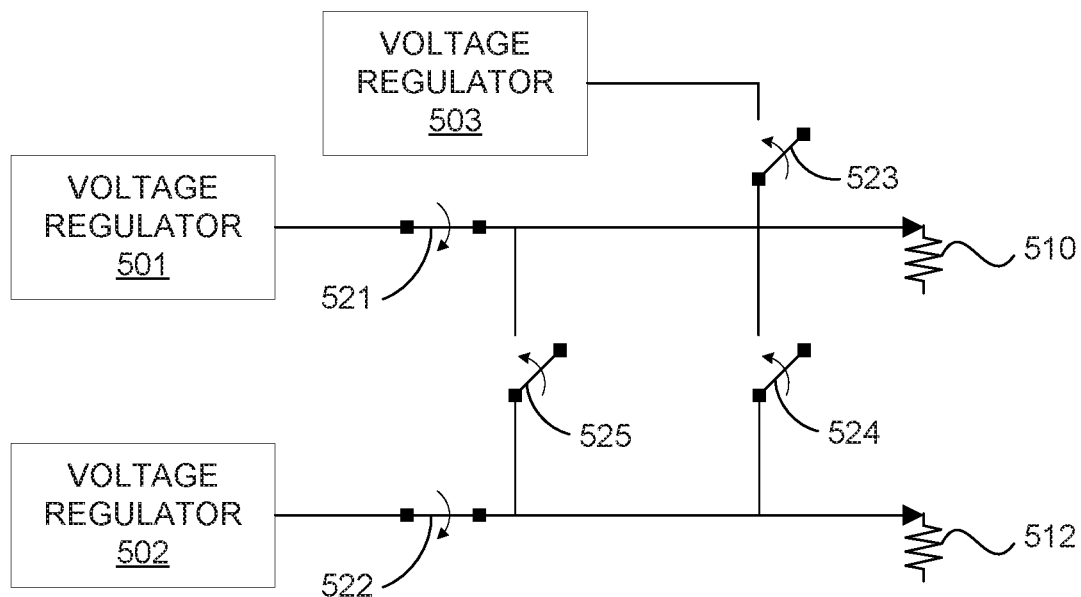
FIGS. 5A-5B illustrate an example of an embodiment that further includes system level power sharing.
Figure 5B:
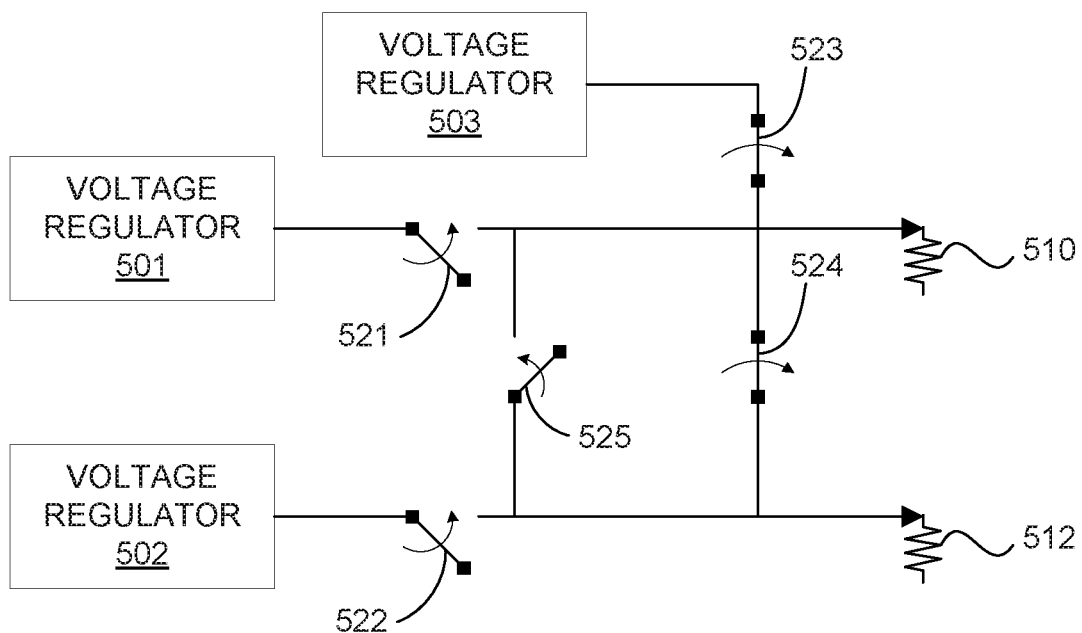

An example of an embodiment that includes system level power sharing is shown in FIGS. 5A-5B. In FIGS. 5A-5B, voltage regulators 501, 502, and 503 are connected to a wiring system that includes switches 521, 522, 523, 524, and 525. Further, the depicted embodiments include load 510 and load 512. In FIG. 5A, switches 521 and 522 are closed with switches 523, 524, and 525 being open. This configuration applies for an embodiment and scenario in which (i) voltage regulators 501 and 502 are configured as backups for each other and (ii) voltage regulator 503 function as a backup for one or both of voltage regulators 501 and 502, but neither voltage regulators 501 nor 502 have failed. As such, voltage regulator 501 supplies power for load 510 and voltage regulator 502 supplies power for load 512.

In contrast, FIG. 5B illustrates an embodiment and scenario in which one or both of voltage regulators 501 and 502 have failed and voltage regulator 503 is now supplying power for both load 510 and load 512. In some scenarios and embodiments, the failure of either voltage regulator 501 or voltage regulator 502 is treated as a predictive indication that both voltage regulator 501 and 502 are due for maintenance. Therefore, in some such embodiments, the failure of either voltage regulator 501 or voltage regulator 502 dictates that both voltage regulator 501 and voltage regulator 502 be replaced by voltage regulator 503 until a maintenance review on the power system has been performed. FIG. 5B also illustrates that switches 521, 522, and 525 have been opened, thereby cutting voltage regulators 501 and 502 out from the circuit, and switches 523 and 524 have been closed such that power is routed from voltage regulator 503 to load 510 and load 512. Embodiments recognize that there are many possible configurations and connection within the scope of this disclosure and that one having ordinary skill in the art will appreciate those configurations.

In some embodiments, normally, a local voltage is derived using low dropout regulators (LDO) or other types of regulators inside an active cable printed circuit board (PCB). In some embodiments, the internal voltages operating the main transponders are given access back into the system, which can then be used as a ground before a failure mode is initiated. In some embodiments, switches define the connectivity of the internal voltage back to the main board in the system. In some embodiments, a mesh like multiplex system is provided that manages failures of regulators.

Some embodiments have system level pre-requisites in which each logical link is connected by cables and can be brought back up, in the event of a regulator failure, while the system is still running. For example, a system level pre-requisite includes a requirement that a high-speed link be tied to a Vertical Cable Rack Manager (VRM). Further, in some cases, a VRM can be tied to set of high-speed lanes that go in one direction. As such, in various embodiments, a system wide topology therefore is leveraged that defines which high speed buses can fail at a given point in time. Some embodiments provide logic that controls one or more switches that dictate the current pathway and are leveraged to train/bring a link up initially or in response to a failure. Some embodiments have system in which system firmware brings links back up at runtime, thereby delaying the service requirement in case of failed Vertical Cable Rack Manager (VRM) in a cable. As such, one having skill in the art readily recognizes that some embodiments provide a system in which there will be no single point of failure. In such embodiments, in the case of failure, the recovery procedures configure the switches for the right connectivity to provide an alternate source of voltage for the cable such that power is maintained/brought back online for a cable with a voltage regulator fault. Some embodiments provide and utilize a method for N+1 voltage regulator tolerance. Some embodiments avoid power sharing with existing power supplies. Some embodiments support full operation of servers, or other device, even with a voltage regulator failure. Some embodiments mitigate or eliminate a need to reduce speed/frequency or degrade performance while avoiding power sharing with existing power supplies. Embodiments recognize that in some designs, without this VRM capability, a failure will cause that cable to shut down and if there was a high-speed bus that was running with two cables, it is now degraded to one cable, which means half performance. However, by using the VRM capability encompassed by certain embodiments, since VRM redundancy activates in response to the failure, the system avoids going into one cable mode, i.e., the system can still run with two cables. Embodiments further recognize that if one regulator is providing power to two cables, then load has to be taken into account since the load of both cables is being handled by the one regulator. In some scenarios, the size of the VRM is used as an indication of how big of a load a given regulator can/should handle and embodiments take into account the maximum load a regulator can handle. For example, if a first regulator failed due to an unusually high load, then the system recognizes this situation and ensures that another regulator is used to power both cables only if that regulator is predicted to be able to handle the combined loads. As such, overall, a single regulator failure in one cable, then can be compensated for by switching to a higher capacity regulator, in comparison to the one that failed, that is included in the next cable. In some embodiments, the larger capacity regulator is external to all the cables and the mother board sources the voltage from the larger capacity regulator to the failed VRM cable. For example, in one embodiment, one external larger-capacity regulator is used to supply backup for a set of six cables. In this embodiment, the one external larger-capacity regulator has double the load capacity of the regulators included with the six cables. As such, the one external larger-capacity regulator can handle the load of two failed regulators at a given time.

Our method enables complete redundancy and full operation per design. The optimization for the design is kept at one per eight (for example) components. Also, in some embodiments, the general redundancy is maintained at a first level of DC/DC converter, but in this case, there is a mix of first level and a second level DC/DC conversion. For example, a system has six cables and each of those has two ends, so a total of twelve ends. Further, each of those ends has a requirement for two VRM connections, one for the transmit (Tx) direction and one for the receive (Rx) direction. In this example, the Tx VRMs have twice the load capacity when compared to the Rx VRMs. As such, a given Tx VRM is predicted to have enough load capacity to handle the combined load of two cables in the case of a failure. However, one more VRM, which is larger than the Tx VRM, is added to the system for redundancy purposes. For example, a larger VRM is added to the motherboard for the six Rx cable ends. As such, if an Rx VRM fails, then the Tx VRM inside the cable can help power up the circuit. Further, if the Tx VRM inside the cable also fails, then the larger VRM on the motherboard is used to power the cable.

Figure 6A:
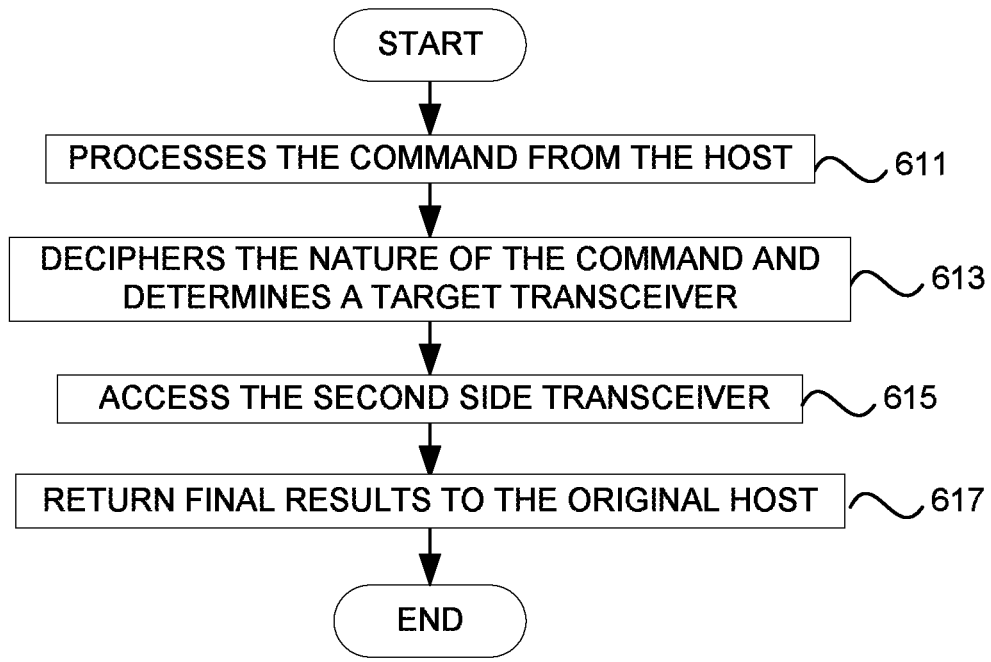
FIG. 6A illustrates operational processes of a cable management program, executing on a computing device within the environment of FIG. 1, in accordance with an exemplary embodiment of the present invention.

In general, FIG. 6A illustrates an embodiment that includes an active cable architecture, comprising: a first transceiver on a first side of the cable; a second transceiver on a second side of the cable; and a first micro-controller that controls the first transceiver and the second transceiver. The first micro-controller is configured to (i) decipher and complete an activity based on single commands accessed through a software interface and (ii) to internally connect a required signal to either end of the cable via execution of cable management program 120.

FIG. 6A illustrates operational processes of cable management program 120, executing on a computing device within the environment of FIG. 1, in accordance with an exemplary embodiment of the present invention.

In process 611, cable management program 120 processes a command from the host, which includes initiating execution of the command by the micro-controller.

In process 613, cable management program 120 deciphers the nature of the command and determines a target transceiver, on the local end, to be used to complete the command.

In process 615, cable management program 120 accesses a second transceiver, which is present on the other end of the cable, i.e., at the opposite end from the target transceiver.

In process 617, cable management program 120 returns a final result, from the execution of the command, to the original host (i.e., the Leader) who initiated the command.

Figure 6B:
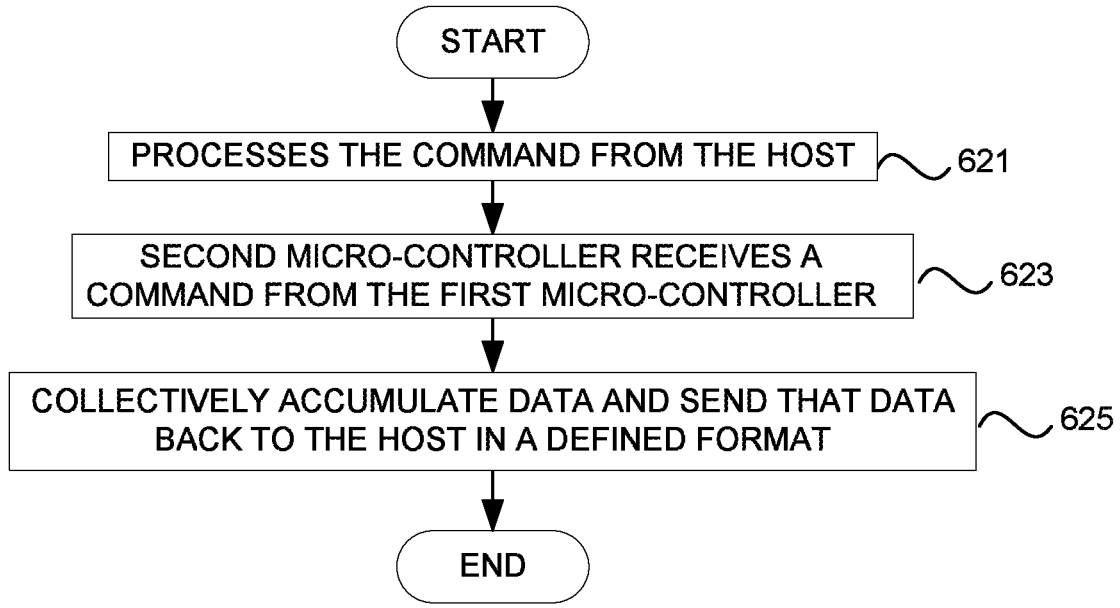
FIG. 6B illustrates operational processes of a cable management program, executing on a computing device within the environment of FIG. 1, in accordance with an exemplary embodiment of the present invention.

FIG. 6B illustrates operational processes of cable management program 120, executing on a computing device within the environment of FIG. 1, in accordance with an exemplary embodiment of the present invention.

In general, FIG. 6B illustrates an embodiment that includes an active cable architecture following that of FIG. 6A and further comprises: a second micro-controller that processes software related updates and checking. The second micro-controller can receive and follow instructions that are sent from the first micro-controller, wherein the first micro-controller controls cable inputs.

In process 621, cable management program 120 processes an incoming request, coming in from the host, by passing the request to the first micro controller, which will handle execution of the request itself.

In process 623, cable management program 120 receives a command from the first micro-controller to pass those commands to a second micro controller. In some embodiments, the commands include, for example and are not limited to, an update of firmware or check a status or change a control register.

In process 625, cable management program 120 collectively accumulates the data, as part of data 125, and sends that data back to the host in a defined format.

Figure 6C:
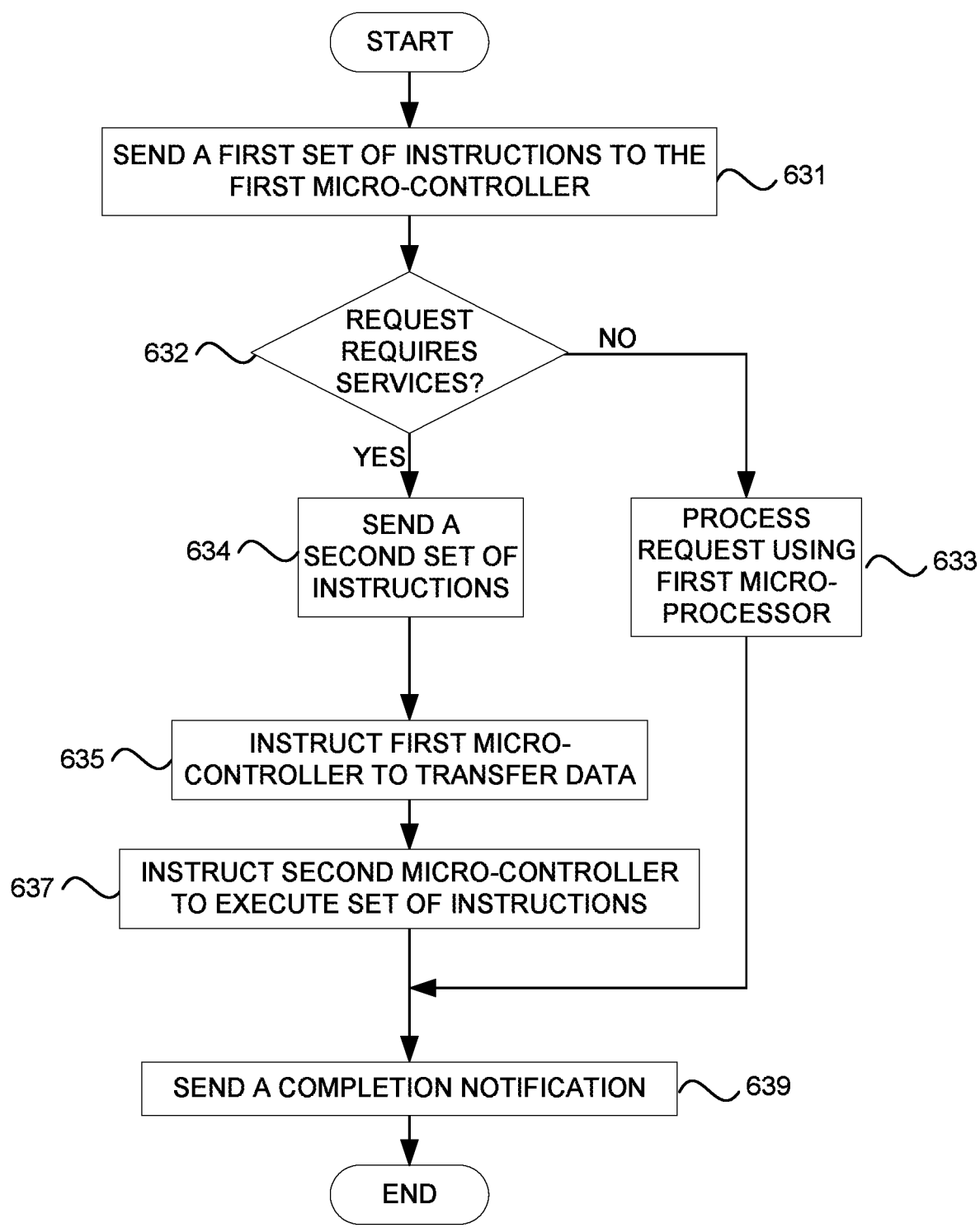
FIG. 6C illustrates operational processes of a cable management program, executing on a computing device within the environment of FIG. 1, in accordance with an exemplary embodiment of the present invention.

FIG. 6C illustrates operational processes of cable management program 120, executing on a computing device within the environment of FIG. 1, in accordance with an exemplary embodiment of the present invention.

In general, FIG. 6C illustrates an embodiment that includes a two micro-controller system that processes updates.

In one embodiment of a two micro-controller design, when one micro-controller is updated, the following steps, i.e., programming/logic, are executed in order to complete the request:

In process 631, cable management program 120, in response to receiving a request, sends a first set of instructions to the first micro-controller. In this embodiment, these instructions instruct the first micro-controller to (a) check if the request indicates that the request requires the services of the second micro-controller and (b) to determine whether that particular instruction or command applies to the second micro-controller.

In decision process 632, cable management program 120 determination whether the request requires the services of, and applies to, the second micro-controller.

If the request does not require the services of and/or apply to, the second micro-controller, then in process 633 processes the request using the first micro-processor.

In process 634, cable management program 120 responds to a determination that the request requires the services of, and applies to, the second micro-controller (decision process 633, "yes" branch), by sending a second set of instructions to the first micro-controller that, when executed, cause the first micro-controller begin/initiate interacting with the second micro-controller using a particular communication/synchronization mode, e.g., semi-synchronous (ssynch) mode.

In process 635, cable management program 120 instructs the first micro-controller to transfer the data, which is required to complete the operation, from data 125 to the second micro-controller.

In process 637, cable management program 120 instructs the second micro-controller to execute the set of instructions and/or actions using the data received from the first micro-controller.

In process 639, cable management program 120 sends a completion notification to the source of the request. In this embodiment and example, cable management program 120 instructs the second micro-controller to send a completed activity response to the first micro-controller, i.e., sends activity data to the first micro-controller indicating a completion status for the activity.

In some embodiments and scenarios, the completion status for a particular communication mode indicates that the mode is now in an "ON" status, which signifies that both micro-controllers have completed the request. In some scenarios and embodiments, a request could include a software update (which is an example of a write update) and a subsequent status check (which is an example of a read type of status check).

In one exemplary embodiment, the processes described herein and shown with reference to FIGS. 1-6C encompass processes of cable management program 120 include the processes of: sending a first set of instructions for completion of an activity to a first micro-controller of an active communication cable; determining that at least one transceiver of an active cable is to receive a set of signals from the first micro-controller; forming a communication connection between the first micro-controller and the at least one transceiver; and sending a second set of instructions to the at least one transceiver, wherein the second set of instructions instruct the at least one transceiver to complete at least a portion of the activity.

In at least one embodiment, in the processes of cable management program 120, the active cable includes the at least one transceiver.

In at least one embodiment, in the processes of cable management program 120, the first micro-controller is connected to a first end of the active communication cable that includes the at least one transceiver.

In at least one embodiment, in the processes of cable management program 120, the active communication cable includes a second microcontroller that is under the command of and follows instructions that are issued by the first microcontroller.

In at least one embodiment, the processes of cable management program 120 include: determining that the activity includes one or both of a software update and a system check; generating a third set of instructions via the first micro-controller, wherein the third set of instructions include instructions to perform one or both of the software update and the system check; and sending the third set of instructions to the second microcontroller, wherein the second microcontroller is programmed to handle software related updates and system checks.

In at least one embodiment, in the processes of cable management program 120, a second micro-controller is connected to a second end of the active communication cable.

In at least one embodiment, the processes of cable management program 120 include: receiving data from at least the first micro-controller that indicates a status of completion of the activity; and passing this data to a source of the first set of instructions.

Figure 7:
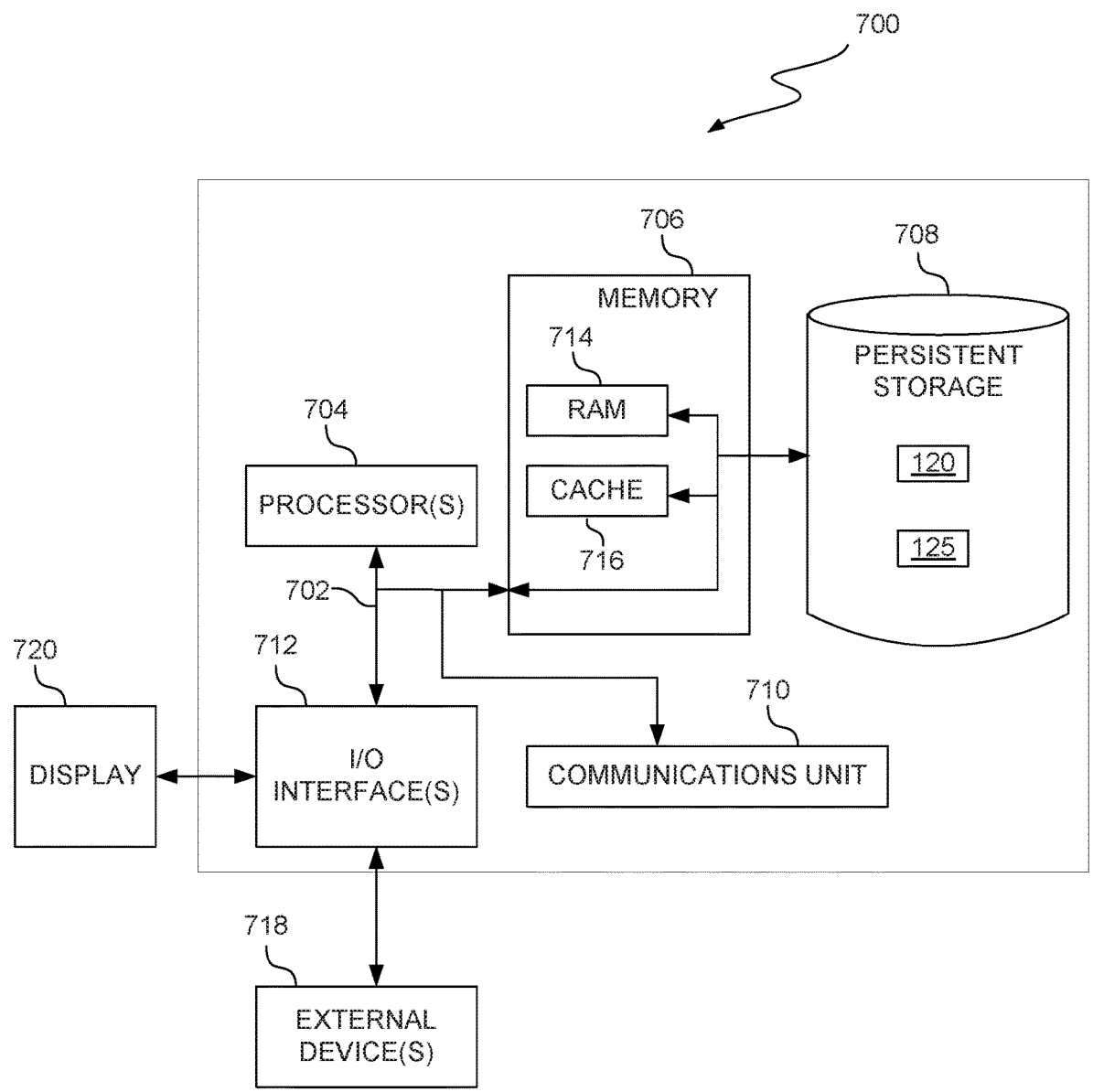
FIG. 7 depicts a block diagram of components of the computing device executing the cable management program, in accordance with an exemplary embodiment of the present invention.

FIG. 7 depicts a block diagram, 700, of components of computing device 105, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 105 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Cable management program 120 and data 125 are stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of network 130. In these examples, communications unit 710 includes one or more network interface cards. Communications unit 710 may provide communications through the use of either or both physical and wireless communications links. Cable management program 120 and data 125 may be downloaded to persistent storage 708 through communications unit 710.

I/O interface(s) 712 allows for input and output of data with other devices that may be connected to computing device 105. For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., cable management program 120 and data 125, can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that certain term(s) used herein may be subject to trademark rights in various jurisdictions throughout the world and are used here only in reference to the products or services properly denominated by the marks to the extent that such trademark rights may exist.

It is apparent that there has been provided approaches for an active cable system. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method, comprising:
    receiving, by a first micro-controller, a first set of instructions from a host to complete an activity associated with an active communication cable;
    determining, by the first micro-controller, that a first transceiver, communicatively connected to the first micro-controller, and associated with the active communication cable is to receive a first set of signals from the first micro-controller;
    determining, by the first micro-controller, that a second transceiver, communicatively connected to the first micro-controller, and associated with the active communication cable is to receive a second set of signals from the first micro-controller;
    forming, by the first micro-controller, communication connections between the first micro-controller and the first transceiver, and the first micro-controller and the second transceiver; and
    sending, by the first micro-controller, a first portion of the first set of instructions to the first transceiver and a second portion of the first set of instructions to the second transceiver, wherein the first portion and the second portion of the first set of instructions instruct the first transceiver and the second transceiver to complete a first portion and a second portion, respectively, of the activity.

2. The computer-implemented method of claim 1, wherein a first end of the active communication cable comprises the first micro-controller and the first transceiver, and a second end of the active communication cable comprises the second transceiver.

3. The computer-implemented method of claim 1, wherein the active communication cable includes a second micro-controller that is under command of and follows instructions issued by the first micro-controller.

4. The computer-implemented method of claim 3, further comprising:
    determining, by the first micro-controller, that the activity includes one or both of a software update and a system check;
    generating, by the first micro-controller, a third set of instructions, wherein the third set of instructions include instructions to perform one or both of the software update and the system check; and
    sending, by the first micro-controller, the third set of instructions to the second microcontroller, wherein the second micro-controller is programmed to handle software related updates and system checks.

5. The computer-implemented method of claim 3, wherein a first end of the active communication cable comprises the first micro-controller and the first transceiver, and a second end of the active communication cable comprises the second micro-controller and the second transceiver.

6. The computer-implemented method of claim 1, further comprising:
    sending, by the first micro-controller, data that indicates a status of completion of the activity to the host.

7. A computer program product, the computer program product comprising a computer readable storage medium having program instructions embodied therewith, wherein the computer readable storage medium is not a transitory signal per se, the program instructions executable by a device to cause the device to perform a method comprising:
    receiving, by a first micro-controller, a first set of instructions from a host to complete an activity associated with an active communication cable;
    determining, by the first micro-controller, that a first transceiver, communicatively connected to the first micro-controller, and associated with the active communication cable is to receive a first set of signals from the first micro-controller;
    determining, by the first micro-controller, that a second transceiver, communicatively connected to the first micro-controller, and associated with the active communication cable is to receive a second set of signals from the first micro-controller;
    forming, by the first micro-controller, communication connections between the first micro-controller and the first transceiver, and the first micro-controller and the second transceiver; and
    sending, by the first micro-controller, a first portion of the first set of instructions to the first transceiver and a second portion of the first set of instructions to the second transceiver, wherein the first portion and the second portion of the first set of instructions instruct the first transceiver and the second transceiver to complete a first portion and a second portion, respectively, of the activity.

8. The computer program product of claim 7, wherein a first end of the active communication cable comprises the first micro-controller and the first transceiver, and a second end of the active communication cable comprises the second transceiver.

9. The computer program product of claim 7, wherein the active communication cable includes a second micro-controller that is under command of and follows instructions issued by the first micro-controller.

10. The computer program product of claim 9, further comprising:
    determining, by the first micro-controller, that the activity includes one or both of a software update and a system check;
    generating, by the first micro-controller, a third set of instructions, wherein the third set of instructions include instructions to perform one or both of the software update and the system check; and
    sending, by the first micro-controller, the third set of instructions to the second microcontroller, wherein the second micro-controller is programmed to handle software related updates and system checks.

11. The computer program product of claim 9, wherein a first end of the active communication cable comprises the first micro-controller and the first transceiver, and a second end of the active communication cable comprises the second micro-controller and the second transceiver.

12. The computer program product of claim 7, further comprising:

sending, by the first micro-controller, data that indicates a status of completion of the activity to the host.

13. A computer system, the computer system comprising:
one or more computer processors;
at least one computer readable storage medium that is not a transitory signal per se; and
program instructions stored on the at least one computer readable storage medium, the program instructions being executable by at least one computer processor of the one or more computer processors to cause the at least one computer processor to perform a method comprising:
receiving, by a first micro-controller, a first set of instructions from a host to complete an activity associated with an active communication cable;
determining, by the first micro-controller, that a first transceiver, communicatively connected to the first micro-controller, and associated with the active communication cable is to receive a first set of signals from the first micro-controller;
determining, by the first micro-controller, that a second transceiver, communicatively connected to the first micro-controller, and associated with the active communication cable is to receive a second set of signals from the first micro-controller;
forming, by the first micro-controller, communication connections between the first micro-controller and the first transceiver, and the first micro-controller and the second transceiver; and
sending, by the first micro-controller, a first portion of the first set of instructions to the first transceiver and a second portion of the first set of instructions to the second transceiver, wherein the first portion and the second portion of the first set of instructions instruct the first transceiver and the second transceiver to complete a first portion and a second portion, respectively, of the activity.

14. The computer system of claim 13, wherein a first end of the active communication cable comprises the first micro-controller and the first transceiver, and a second end of the active communication cable comprises the second transceiver.

15. The computer system of claim 13, wherein the active communication cable includes a second micro-controller that is under command of and follows instructions issued by the first micro-controller.

16. The computer system of claim 15, further comprising:
determining, by the first micro-controller, that the activity includes one or both of a software update and a system check;
generating, by the first micro-controller, a third set of instructions, wherein the third set of instructions include instructions to perform one or both of the software update and the system check; and
sending, by the first micro-controller, the third set of instructions to the second microcontroller, wherein the second micro-controller is programmed to handle software related updates and system checks.

17. The computer system of claim 15, wherein a first end of the active communication cable comprises the first micro-controller and the first transceiver, and a second end of the active communication cable comprises the second micro-controller and the second transceiver.

18. The computer system of claim 15, further comprising:
automatically updating the second micro-controller based, at least in part, on a handshake from the first micro-controller.

19. The computer program product of claim 9, further comprising:
automatically updating the second micro-controller based, at least in part, on a handshake from the first micro-controller.

20. The computer implemented method of claim 1, further comprising:
automatically updating the second micro-controller based, at least in part, on a handshake from the first micro-controller.

* * * * *